UNITED STATES PATENT OFFICE.

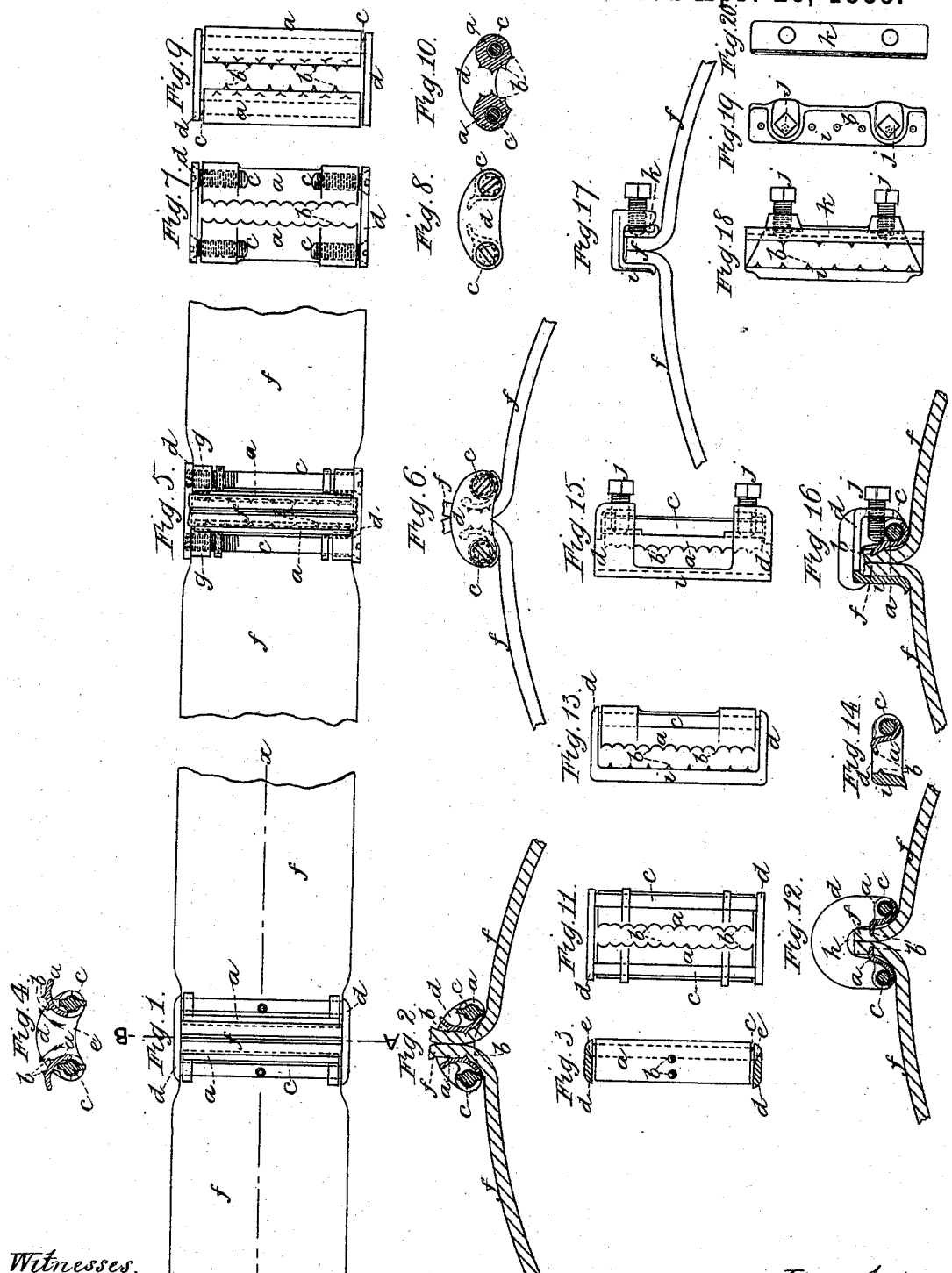

WILLIAM H. SLEEP, OF ST. GERMANS, COUNTY OF CORNWALL, ENGLAND.

BELT-FASTENER.

SPECIFICATION forming part of Letters Patent No. 316,668, dated April 28, 1885.

Application filed May 7, 1883. (No model.) Patented in England December 9, 1882, No. 5,901; in France April 18, 1883, No. 154,936, and in Belgium April 21, 1883, No. 61,188.

*To all whom it may concern:*

Be it known that I, WILLIAM HENRY SLEEP, a subject of the Queen of Great Britain, residing at St. Germans, in the county of Cornwall, England, have invented new and useful Improvements in Belt-Fasteners, of which the following is a specification.

My said invention has reference to improvements in the construction of connectors or fasteners for uniting the ends or intermediate lengths or sections of driving and other straps, bands, belts, or cords of any section, and whether composed of one or more pieces or lengths, whereby sewing, lacing, riveting, or other such like methods of connecting are dispensed with, and which methods, besides occupying considerable time, also diminish the strength and durability of the belting material of whatever kind, owing to the necessity for piercing the same to retain the fastener.

By my invention, piercing being entirely dispensed with, the strength of the material is fully maintained, while provision is also made for quickly, economically, and effectively securing the ends of the bands or belts by an arrangement which when applied is both self-acting and self-holding, or which may be tightened or held in position by means of screws, bolts, or rivets.

In carrying out my invention I employ one or more eccentric rollers, tongues, or holders of suitable shape, and suitably held together at the ends by means of straight-edged or concavo-convex plates, which may be made with or without bosses, and in either case may be grooved or channeled for the reception of the ends of the bands or belts and placed on their edge, rivets or screws passing through the plates and bosses and longitudinally through the rollers, tongues, or holders, or may terminate a suitable distance from the ends of the rollers, tongues, or holders, such means being adopted for expanding or contracting the connector or fastener longitudinally; or such rollers, tongues, or holders may be made with studs or rivets in the same at each end to connect the plates; or the plates may be made with studs or rivets in the same for connecting the rollers, tongues, or holders; or, I may construct a frame or part frame of suitable shape to carry such rollers, tongues, or holders, and instead of the two plates above mentioned I may use one only, semi-tubular, with internal rollers, tongues, or holders, and instead of the above-mentioned channel end plates I may use one of continuous channel form, with one side perforated or not, and in the other side bosses suitably placed, through which set-screws pass, the ends of which press or screw against a false or portable plate or eccentric tongue of the same length and depth as the channel.

In order to enable my invention to be fully understood and carried into practice, I will proceed to describe the same by reference to the accompanying drawings, which represent views of belt-fasteners constructed according to my improvements.

Similar letters in all the figures represent similar parts.

Figure 1 is a plan of a belt-fastener applied to a belt and showing the arrangement when two eccentric plates, tongues, or holders are employed. Fig. 2 is a transverse section of same on line *x x*, Fig. 1. Fig. 3 is a section on line A B of Fig. 1, and Fig. 4 is a cross-section showing the tongues opened, the belt not being shown in Figs. 3 and 4. Figs. 5 to 20, inclusive, are modifications.

In these figures *a a* are two eccentric plates, tongues, or holders formed or provided with projections or teeth *b b*, as shown, and moving or rotating on the rods or bolts *c c*, connected together by the end plates or pieces, *d d*. The inner lower edge of each end piece is beveled or cut away at *e e*, for the purpose hereinafter described.

To make use of a belt-fastener of this construction, the tongues *a a* are turned on their rods or bolts *c c* in the direction of the arrows, as shown at Fig. 4, and the ends of the belt or strap or section of belt or strap *f* to be connected or fastened together are placed together flatwise, and are passed up between the two eccentric tongues or holders *a a*, the belt or strap *f* being then pulled downward, and the driving-strain being brought upon the belt, the tongues or holders *a a* being eccentric to the rods or bolts *c c* on which they turn will be brought together, and thereby grip the belt, as shown in Fig. 2, and the greater the strain on the belt the firmer will the tongues or holders *a* grip the ends of the belt, and by beveling the end pieces, as hereinbefore described, and shown at *e e*, Fig. 3, the ends of a belt practically of the same width as the outside length of the fastener may be connected together so that the fastener does not project beyond the edges of the belt, and thereby presents no obstacle to the fork in moving the belt from the fast to the loose pulley, or vice versa.

The fastener shown in plan and end views in Figs. 5 and 6 is substantially the same as that shown in Figs. 1, 2, 3, and 4, except that one end of the rods or bolts *c c* are screw-threaded, and screw into the bosses *g g* of one of the end plates *d d*. This arrangement allows of the fastener being contracted longitudinally by screwing up the bolts *c c* so as to bring the ends of the fastener within the sides of the belt *f*, as shown. The action is otherwise the same as that hereinbefore described, and therefore needs no further description.

Instead of the rods or bolts passing from end to end, as hereinbefore described, each tongue or holder may be connected to the end plates, *d d*, by two screw-bolts, *c c c c*, as shown in plan and end at Figs. 7 and 8, the arrangement being for the same purpose as above described when referring to Figs. 5 and 6. In these figures the edges of the tongues are serrated to grip the belt.

For wide belts, where it is advisable to employ a number of fasteners, I form the end plates, *d d*, of a saddle or half-moon shape, as shown in Figs. 11 and 12, the hollow part *h* passing over the turned-up ends of the belts, as shown.

Figs. 13 and 14 show a plan and cross-section of a fastener in which only one movable tongue or holder *a* and one rod or bolt *c* are employed, the end plates, *d d*, being connected together or formed in one piece by or with the cross-piece or fixed plate *i*, formed with serrations or teeth, as shown, the strain on the belt causing the ends to be gripped between the tongue *a* and the fixed plate *i*. When only one tongue is employed, I sometimes employ the arrangement shown in plan and cross-section at Figs. 15 and 16, which is substantially the same as that shown in Figs. 13 and 14, except that screws *j j* are employed to move the tongue *a* so as to grip the belt between the tongue *a* and the fixed plate *i*, and when once gripped is self-holding; or, where a fixed plate is employed, instead of employing a tongue or holder *a* turning on a rod or bolt *c*, as shown in Figs. 15 and 16, the holder may consist of a loose plate, *k*, (shown in Figs. 17, 18, and 19,) screws *j j* serving to press the holder or loose plate *k*, as in Figs. 15 and 16, so as to grip the ends of the belt *f* between the holder and the fixed plate *i*.

Fig. 17 is an end view of this construction of belt-fastener, showing the two ends of a belt; Fig. 18, a plan of the under side of the same without the belt. Fig. 19 is a side view of Fig. 18 without the loose plate *k*, and Fig. 20 is a side view of the loose plate *k*.

Having thus described my said invention and the best means with which I am acquainted for carrying the same into effect, I would have it understood that what I claim is—

A belt-fastener having two end plates, screw-threaded rods passing through said plates for adjusting the same, and curved swinging tongues or plates provided with biting-surfaces, and pivoted to said rods, substantially as described.

W. H. SLEEP.

Witnesses:
I. H. GEAKE,
*Of St. Germans, Cornwall, Law Student.*
JAMES R. DODD,
*Of 5 Portland Place East, Plymouth, Accountant.*